United States Patent [19]
Eng et al.

[11] Patent Number: 5,175,640
[45] Date of Patent: Dec. 29, 1992

[54] INTERLEAVED RECEIVERS

[75] Inventors: Kai Y. Eng, Eatontown; Richard D. Gitlin, Little Silver; Mario A. Santoro, Shrewsbury, all of N.J.

[73] Assignee: AT&T Bell Laboratories, Murray Hill, N.J.

[21] Appl. No.: 514,627

[22] Filed: Apr. 25, 1990

[51] Int. Cl.⁵ .............................................. H04J 4/00
[52] U.S. Cl. ................... 359/123; 359/135; 370/50; 455/132
[58] Field of Search ................ 370/4, 1, 50, 58.1, 370/70, 95.1; 455/619, 617, 132; 359/123, 135, 137, 139, 189, 157

[56] References Cited

U.S. PATENT DOCUMENTS

| | | | |
|---|---|---|---|
| 5,005,166 | 4/1991 | Suzuki et al. | 370/1 |
| 5,005,167 | 4/1991 | Arthurs et al. | 370/4 |
| 5,018,130 | 5/1991 | Suzuki et al. | 370/1 |

FOREIGN PATENT DOCUMENTS

| | | | |
|---|---|---|---|
| 0136955 | 6/1988 | Japan | 370/1 |
| 0129594 | 5/1989 | Japan | 370/4 |

OTHER PUBLICATIONS

M. S. Goodman et al., "Demonstration of Fast Wavelength Tuning for a High Performance Packet Switch", Proc., 14th Euro. Conf. on Opt. Commun., pp. 255-258, 1988.

"Frequency-Division-Multiplex Coherent Optical Switch Experiment with Monolitic Tunable Lasers Covering a 1000-GHz Range" by K. Y. Eng, M. Santoro, T. L. Koch, W. W. Snell and J. Stone. Proceedigns of the OSA Topical Meeting on Photonic Switching, Mar. 1-3, 1989, Salt Lake City, Utah.

Primary Examiner—Edward L. Coles, Sr.
Assistant Examiner—Kinfe-Michael Negash
Attorney, Agent, or Firm—T. Stafford

[57] ABSTRACT

A plurality of M receivers are utilized to receive a plurality of N channels from various incoming multiplexed data signals, $N \geq M$, where each incoming data signal arrives on a separate wavelength and comprises several channels. Each of the M receivers, in sequence, receives a separate one of the N channels, thereby M of the N channels. The process then repeats for the next M channels, in the same sequence as the first M channels. The repetitions continue until all N channels are received.

15 Claims, 3 Drawing Sheets

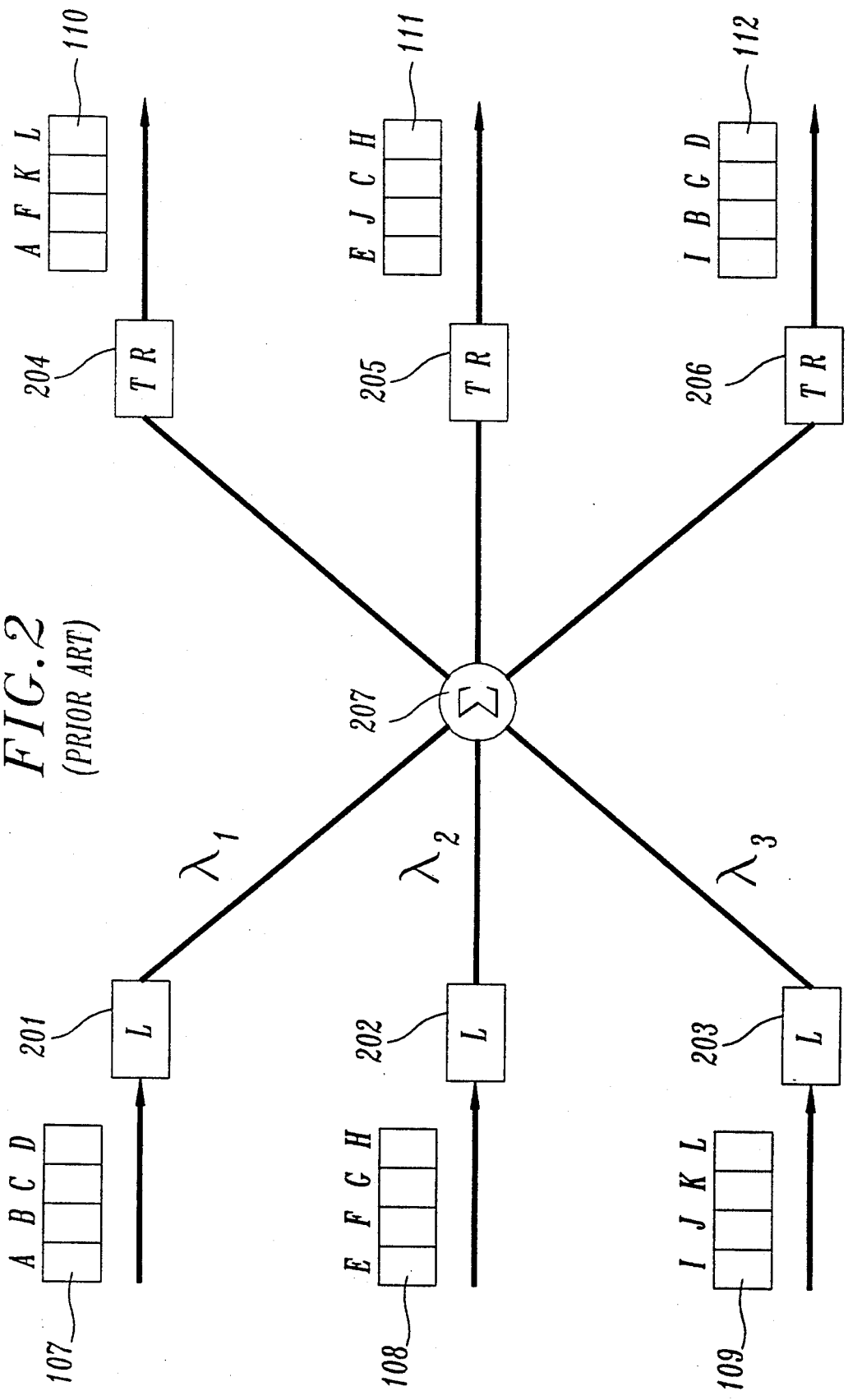

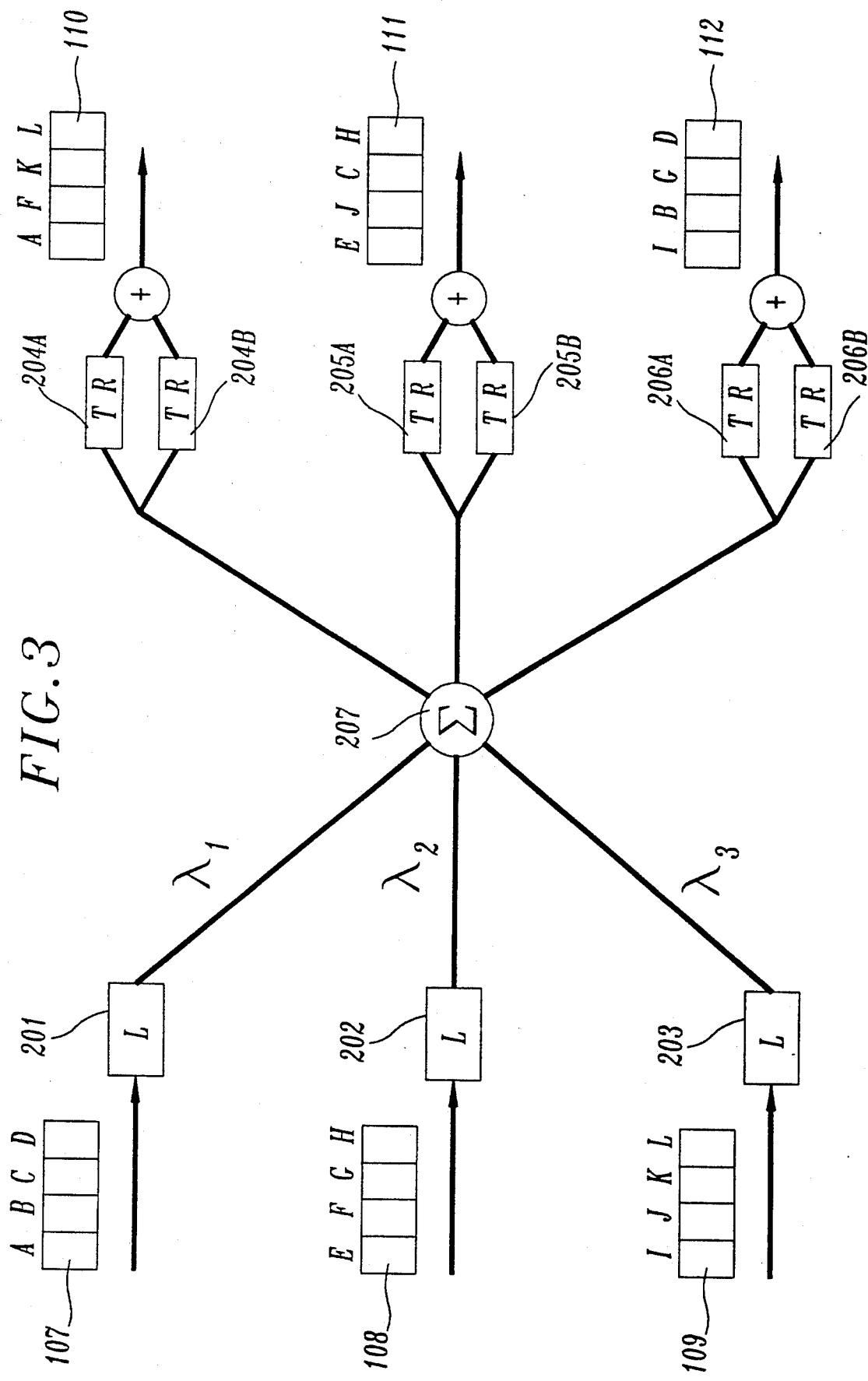

INTERLEAVED RECEIVERS

TECHNICAL FIELD

This invention relates generally to switching, and more particularly to Time-Multiplex switches.

DESCRIPTION OF THE PRIOR ART

Time-Multiplex (T-M) switches are typically utilized to construct a plurality of outgoing multiplexed data streams from various channels of a plurality of incoming multiplexed data streams. A block diagram of an exemplary T-M switch of the prior art is shown in FIG. 1. The T-M Switch of FIG. 1 includes three 1:3 switches 101-104 and three 3:1 switches 104-106. Each channel is associated with a separate letter, as labeled in FIG. 1. For purposes of explanation herein, a time slot means the duration of one of the TDM channels A-L.

In operation, an exemplary three Time Division Multiplexed (TDM) signals 107-109, each comprising four TDM channels, are received by the T-M switch. Each TDM signal is received by a separate one of 1:3 switches 101-103 as shown. During the first time slot, switch 101 transmits all arriving data to switch 106, while switches 102 and 103 transmit all arriving data to switches 105 and 104, respectively. For the second time slot, which comprises the second TDM channel, switches 101, 102 and 103 transmit all incoming data to switches 105, 106, and 104, respectively. As can ben seen from the FIG. 1, the third and fourth TDM channels are also switched from the input on which they arrive to a predetermined output. Thus, the T-M switch serves to generate a plurality of outgoing TDM signals 110-112, from various incoming channels of incoming TDM signals 107-109.

It can be appreciated that these 1:K and K:1 switches, where K is 3 in the above example, get complicated as the number of incoming data streams becomes large, and their switching requirement on a slot-by-slot basis also becomes stringent as the signal speed increases. Recently, optical implementations have been proposed for higher signal speeds and larger switch sizes. One such optical T-M switch is described in the article "Frequency Division Multiplex Coherent Optical Switch Experiment with Monolithic Tunable Lasers Covering a 1000 GHz Range", by K. Y. Eng et al., *Proceedings of the OSA Topical Meeting on Photonic Switching*, Mar. 1-3, 1989. A block diagram of the T-M switch of the type disclosed in the Eng article is shown in FIG. 2.

FIG. 2 comprises (1) star coupler 207, (2) lasers 201-203, and (3) optical receivers (TR) 204-206. In operation, TDM signals 107-109 are each used to modulate a separate one of lasers (L) 201-203. Each laser is tuned to a different wavelength, as shown in FIG. 2. The optical receivers 204-206 then retune as required in order to receive the channels required to generate their associated outgoing TDM signal. The technique can best be described by way of the following example.

Outgoing TDM signal 110 of FIG. 2 comprises four channels A, F, K, and L. In order to generate this outgoing multiplexed signal, optical receiver 204 would tune to λ3 for the first and second time slots, thereby receiving the first and second channels L and K. Optical receiver 204 would then tune to λ2 for the third time slot, and λ1 for the fourth time slot, thereby receiving channels F and A. It can be seen from FIG. 2 that this will result in outgoing multiplexed signal 110 being constructed as shown. Exemplary optical receivers 205-206 operate in a similar manner.

It can also be seen that in order for the T-M Cross Connect switch of FIG. 2 to operate as described, optical receivers 204-206 must be capable of retuning very fast. For example, note that optical receiver 204 receives channel F immediately after receiving channel K. Examination of FIG. 2 reveals that receiver 204 must therefore tune from λ3 to λ2. Further, it is clear that receiver 204 must do this retuning between the end of the second time slot and the start of the third time slot. While this problem has been described with reference to optical receiver 204, it can be seen that the same problem exists in optical receivers 205-206. At GB/s data rates, the optical receivers represent a bottleneck in the system. Further, fast retunable optical receivers are difficult to manufacture.

SUMMARY OF THE INVENTION

The foregoing problems are solved in accordance with the present invention which relates to a technique for receiving a plurality of N channels from various incoming TDM signals by utilizing a plurality of M receivers ($1 < M < N$), where at least two of the TDM signals are in different states; e.g. on different frequencies. In one embodiment of the invention, each receiver receives a channel from a TDM signal, and then retunes while other receivers receive other channels. For example, if two receivers are utilized to receive four channels one receiver would receive the first channel, retune during the second channel, and then receive the third channel. The other receiver would receive the second channel, retune during the third channel, and then receive the fourth channel.

It can be seen from the above summary that a receiver which receives the ith channel will also receive the i+Mth channel and will not receive the i+1th channel. Therefore, the receiver can retune while the other M-1 receivers are receiving M-1 other channels. In this manner, the requirement for fast retuning is eliminated.

BRIEF DESCRIPTION OF THE DRAWING

FIG. 2 shows an optical T-M switch of the prior art, and

FIG. 3 shows a block diagram of an exemplary T-M switch in accordance with the invention.

DETAILED DESCRIPTION

Figure 1:
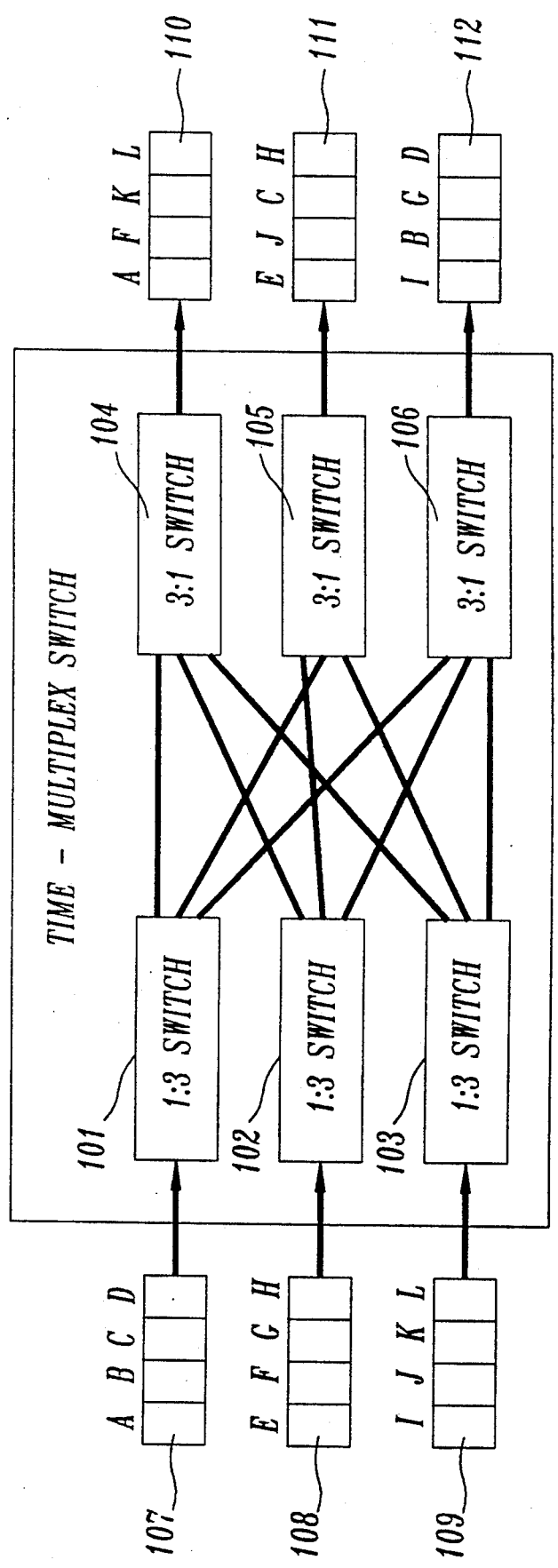
FIG. 1 shows a block diagram of a conventional T-M switch of the prior art.

FIG. 3 shows a block diagram of an exemplary implementation of the invention. FIG. 3 comprises (1) star coupler 207, (2) lasers (L) 201-203, and (3) optical receivers (TB) 204A-206B. the incoming and outgoing multiplexed signals correspond to those previously discussed.

In operation, incoming multiplexed signals 107-109 arrive at lasers 201-203 and are modulated as previously described. Operation of the receivers will be described with reference to receiver 205, with the understanding that the remainder of the receivers operate similarly.

For the first time slot, receiver 205A is tuned to receive λ2, and therefore receives channel H. During the second time slot, receiver 205B is tuned to receive λ1, and therefore receives channel C. Also during the second time slot, receiver 205A retunes to λ3 from λ2. Note that since receiver 205B is receiving the desired second channel, receiver 205A has the entire second time slot to retune. During the third time slot, receiver 205A receives λ3 thereby receiving channel J. Simultaneously therewith, receiver 205B retunes to λ2. During the fourth time slot, channel E is received by receiver 205B. As can be seen from the previous description, each receiver has an entire time slot to retune. Further, if a receiver requires two or more channels during the same time slot, the channels can simply be interchanged in accordance with well-known techniques.

While the above description is for illustrative purposes, other variations of the invention are possible without violating the spirit and scope thereof. For example, the number of receivers utilized to construct each outgoing multiplexed signal may be greater than two. Further, this number may be the same or different for each outgoing multiplexed signal. The time slots may be grouped into standard units, such as bytes. Further, while the invention solves a problem related to optical T-M switches, the invention may be utilized with any transmission technique. It can also be seen that if N divided by M is an integer X, then each receivers will retune X number of times in each TDM frame. The TDM signals may differ in polarizations, coding structure, etc., rather than in frequency. Finally, every M+1th channel in the incoming TDM signals could be reserved for retuning, although this is slightly less efficient than the preferred embodiment previously described.

We claim:

1. In receiver apparatus including a plurality of tunable receivers each having an input and an output, said inputs of said plurality of tunable receivers being connected in parallel for receiving from a single incoming communications path a plurality of incoming channels from a plurality of time division multiplexed (TDM) signals at different wavelengths, a method comprising the steps of:

tuning a first one of said plurality of tunable receivers to a first prescribed wavelength corresponding to one of said TDM signals to receive one of said plurality of channels from said single incoming communications path during a current channel time slot;

tuning at least a second one of said plurality of tunable receivers to a second prescribed wavelength corresponding to another of said TDM signals during said current channel time slot in which said first one of said plurality of tunable receivers is receiving a channel in order to receive another of said plurality of channels from said single incoming communications path during a channel time slot subsequent to the current channel time slot; and supplying outputs from said first one and said at least second one of said plurality of tunable receivers to a single outgoing communications path during respective channel time slots in which said first one and said at least second one of said plurality of tunable receivers are receiving said respective channels.

2. The method as defined in claim 1 further including the step of retuning said first one of said plurality of tunable receivers during said subsequent channel time slot, as needed, to receive another of said plurality of channels during a further subsequent channel time slot.

3. The method of claim 2 wherein said tunable receivers are optical receivers.

4. The method as defined in claim 1 further including the step of alternately retuning said first one and said at least second one of said plurality of tunable receivers, as needed, during alternate channel time slots.

5. The method of claim 4 wherein said tunable receivers are optical receivers.

6. Receiver apparatus being connected for receiving from a single incoming communications path a plurality of incoming channels from a plurality of time division multiplexed (TDM) signals at different wavelengths, comprising:

a plurality of tunable receivers each having an input and an output, said inputs of said plurality of tunable receivers being connected in parallel to said single incoming communications path;

a first one of said plurality of tunable receivers being tunable to a first prescribed wavelength corresponding to one of said TDM signals to receive one of said plurality of channels from said single incoming communications path during a current channel time slot;

at least a second one of said plurality of tunable receivers being tunable to a second prescribed wavelength corresponding to another of said TDM signals during said current channel time slot in which said first one of said plurality of tunable receivers is receiving a channel in order to receive another of said plurality of channels from said single incoming communications path during a channel time slot subsequent to the current channel time slot; and means for supplying outputs from said first one and said at least second one of said plurality of tunable receivers to a single outgoing communications path during respective channel time slots in which said first one and said at least second one of said plurality of tunable receivers are receiving said respective channels.

7. The receiver apparatus as defined in claim 6 wherein said first one of said plurality of tunable receivers is retuned during said subsequent channel time slot, as needed, to receive another of said plurality of channels from said single incoming communications path during a further subsequent channel time slot.

8. The apparatus defined in claim 7 wherein the tunable receivers are optical receivers.

9. The receiver apparatus as defined in claim 6 wherein said first one and said at least second one of said plurality of tunable receivers are retuned, as needed, during alternate ones of said channel times slots.

10. The apparatus defined in claim 9 wherein the tunable receivers are optical receivers.

11. A system including a plurality of receivers connected on a one-to-one basis with a corresponding plurality of single incoming communications paths, each of the receivers receiving from its connected single incoming communications path a plurality of incoming channels from a plurality of time division multiplexed (TDM) signals at different wavelengths, each of the receivers comprising:

a plurality of tunable receivers each having an input and an output, said inputs of said plurality of receivers being connected in parallel to said single incoming communications path;

a first one of said plurality of tunable receivers being tunable to a first prescribed wavelength corresponding to one of said TDM signals to receive one of said plurality of channels from said single communications path during a current channel time slot;

at least a second one of said plurality of tunable receivers being tunable to a second prescribed wavelength corresponding to another of said TDM signals during said current channel time slot in which said first one of said plurality of tunable receivers is receiving a channel in order to receive another of said plurality of channels from said single incoming communications path during a channel time slot subsequent to the current channel time slot; and means for supplying outputs from said first one and said at least second one of said plurality of tunable receivers to a single outgoing communications path during respective channel time slots in which said first one and said at least second one of said plurality of tunable receivers are receiving said respective channels.

12. The system as defined in claim 11 wherein said first one of said plurality of tunable receivers is retuned during said subsequent channel time slot, as needed, to receive another of said plurality of channels from said single incoming communications path during a further subsequent channel time slot.

13. Apparatus according to claim 12 wherein the tunable receivers are optical receivers.

14. The system as defined in claim 11 wherein said first one and said at least second one of said plurality of tunable receivers are retuned, as needed, during alternate ones of said channel time slots.

15. Apparatus according to claim 14 wherein the tunable receivers are optical receivers.

* * * * *